United States Patent
Kim

(10) Patent No.: US 10,290,024 B2
(45) Date of Patent: May 14, 2019

(54) DEVICE FOR PROVIDING KEYWORD ADVERTISING, METHOD FOR PROVIDING SUCH KEYWORD ADVERTISING, AND RECORDING MEDIUM ON WHICH IS RECORDED A PROGRAM FOR EXECUTING SAME

(75) Inventor: Shin Myung Kim, Seoul (KR)

(73) Assignee: ELEVEN STREET CO., LTD., Seoul (KR)

( * ) Notice: Subject to any disclaimer, the term of this patent is extended or adjusted under 35 U.S.C. 154(b) by 997 days.

(21) Appl. No.: 14/350,270

(22) PCT Filed: Mar. 21, 2012

(86) PCT No.: PCT/KR2012/002029
§ 371 (c)(1),
(2), (4) Date: Apr. 7, 2014

(87) PCT Pub. No.: WO2013/054991
PCT Pub. Date: Apr. 18, 2013

(65) Prior Publication Data
US 2014/0229283 A1    Aug. 14, 2014

(30) Foreign Application Priority Data

Oct. 11, 2011 (KR) ........................ 10-2011-0103520

(51) Int. Cl.
*G06Q 30/00* (2012.01)
*G06Q 30/02* (2012.01)

(52) U.S. Cl.
CPC ..... *G06Q 30/0275* (2013.01); *G06Q 30/0241* (2013.01); *G06Q 30/0256* (2013.01)

(58) Field of Classification Search
CPC .......... G06Q 30/0241; G06Q 30/0275; G06Q 30/0256
(Continued)

(56) References Cited

U.S. PATENT DOCUMENTS 6,269,361 B1 * 7/2001 Davis ..................... G06Q 30/02
6,484,182 B1 * 11/2002 Dunphy ............ G06F 17/30958
                                                                    700/231

(Continued)

FOREIGN PATENT DOCUMENTS

JP        2007241894 A      9/2007
KR     1020040059115 A      7/2004
(Continued)

*Primary Examiner* — Luis A Brown
(74) *Attorney, Agent, or Firm* — Brinks Gilson & Lione

(57) ABSTRACT

A device for providing keyword advertising capable of efficiently setting advertising costs, when providing keyword advertising via a network; a method for providing such keyword advertising; and a recording medium on which is recorded a program for executing same are provided. Billing is executed based on a final-bid price by one or more advertiser requesting to bid for specific keyword advertising but also by: confirming the bid time of each advertiser and setting a final-bid raking based on the bid amount; setting a final-bid ranking, that is based on the bid time, for advertisers who submitted the same bid amount; and setting, as the final-bid price of each advertiser, a monetary amount with a high pre-set amount vis-à-vis bids of advertisers entering final-bid in lower ranking based on the set final-bid ranking.

2 Claims, 5 Drawing Sheets

(58) Field of Classification Search
USPC .......... 705/14.54, 14.71, 14.69, 14.55, 14.49
See application file for complete search history.

(56) References Cited

U.S. PATENT DOCUMENTS

| | | | | |
|---|---|---|---|---|
| 6,961,858 | B2* | 11/2005 | Fransdonk | G06F 21/10 380/281 |
| 7,020,635 | B2* | 3/2006 | Hamilton | G06Q 20/00 705/51 |
| 7,080,049 | B2* | 7/2006 | Truitt | G06Q 20/16 380/30 |
| 7,090,128 | B2* | 8/2006 | Farley | H04L 67/2823 235/384 |
| 7,107,462 | B2* | 9/2006 | Fransdonk | G06Q 20/12 380/282 |
| 7,150,045 | B2* | 12/2006 | Koelle | G06F 21/552 380/201 |
| 7,587,502 | B2* | 9/2009 | Crawford | A63F 13/12 463/42 |
| 7,620,606 | B2* | 11/2009 | Gentry | G06Q 20/02 380/277 |
| 7,711,586 | B2* | 5/2010 | Aggarwal | G06Q 10/02 700/14 |
| 2001/0047297 | A1* | 11/2001 | Wen | G06Q 30/02 705/14.55 |
| 2003/0120662 | A1* | 6/2003 | Vishik | G06F 16/367 |
| 2004/0103024 | A1* | 5/2004 | Patel | G06Q 30/02 705/14.53 |
| 2004/0186776 | A1* | 9/2004 | Llach | G06Q 30/02 705/14.66 |
| 2005/0027594 | A1* | 2/2005 | Yasnovsky | G06Q 30/02 705/14.55 |
| 2005/0043998 | A1* | 2/2005 | Bross | G06Q 20/207 705/19 |
| 2005/0267834 | A1* | 12/2005 | Zetmeir | G06Q 30/02 705/37 |
| 2006/0004628 | A1* | 1/2006 | Axe | G06Q 30/02 705/14.46 |
| 2006/0129453 | A1* | 6/2006 | Gardner | G06Q 30/02 705/14.69 |
| 2006/0271426 | A1* | 11/2006 | Borgs | G06Q 30/02 705/14.69 |
| 2007/0130005 | A1* | 6/2007 | Jaschke | G06Q 30/02 705/14.66 |
| 2007/0192190 | A1* | 8/2007 | Granville | G06Q 30/02 705/14.69 |
| 2007/0233556 | A1* | 10/2007 | Koningstein | G06Q 30/02 705/14.42 |
| 2007/0288350 | A1* | 12/2007 | Bykowsky | G06Q 30/0273 705/37 |
| 2008/0103953 | A1* | 5/2008 | Flake | G06Q 30/02 705/37 |
| 2008/0275770 | A1* | 11/2008 | Kitts | G06Q 30/02 705/14.46 |
| 2009/0164635 | A1* | 6/2009 | Denker | H04L 63/105 709/226 |
| 2010/0082439 | A9* | 4/2010 | Patel | G06Q 30/02 705/14.72 |
| 2011/0131099 | A1* | 6/2011 | Shields | G06Q 30/02 705/14.71 |
| 2011/0251901 | A1* | 10/2011 | Kwon | G06Q 30/02 705/14.71 |
| 2011/0264514 | A1* | 10/2011 | Kwon | G06Q 30/02 705/14.45 |
| 2014/0229283 | A1* | 8/2014 | Kim | G06Q 30/0241 705/14.54 |

FOREIGN PATENT DOCUMENTS

| | | |
|---|---|---|
| KR | 1020050026939 A | 3/2005 |
| KR | 1020070046585 A | 5/2007 |
| KR | 1020100032585 A | 3/2010 |

\* cited by examiner

【FIG 1】
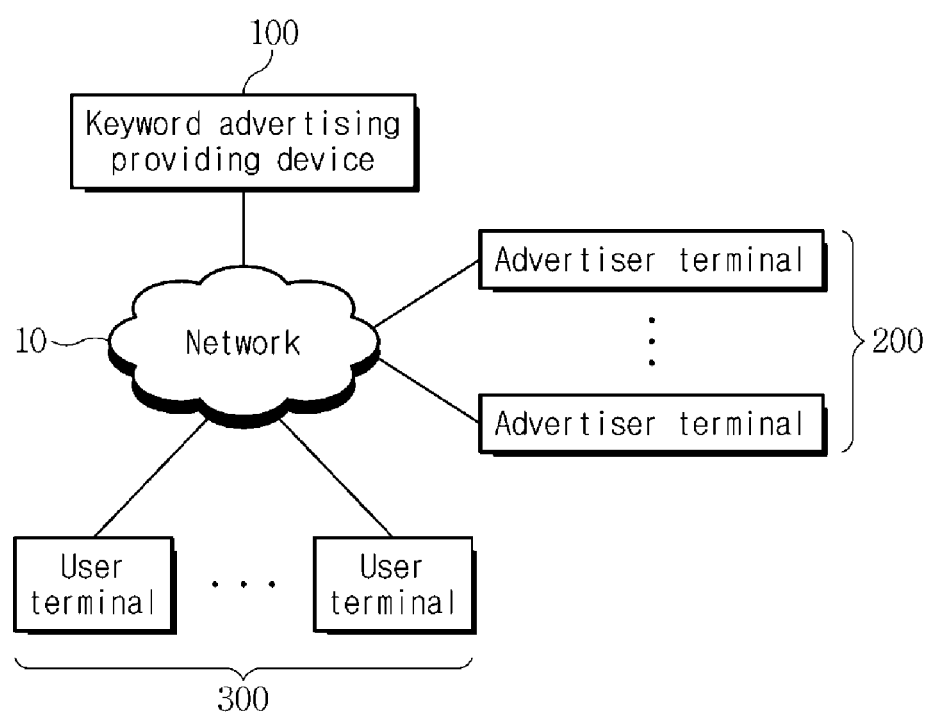

[FIG 2]
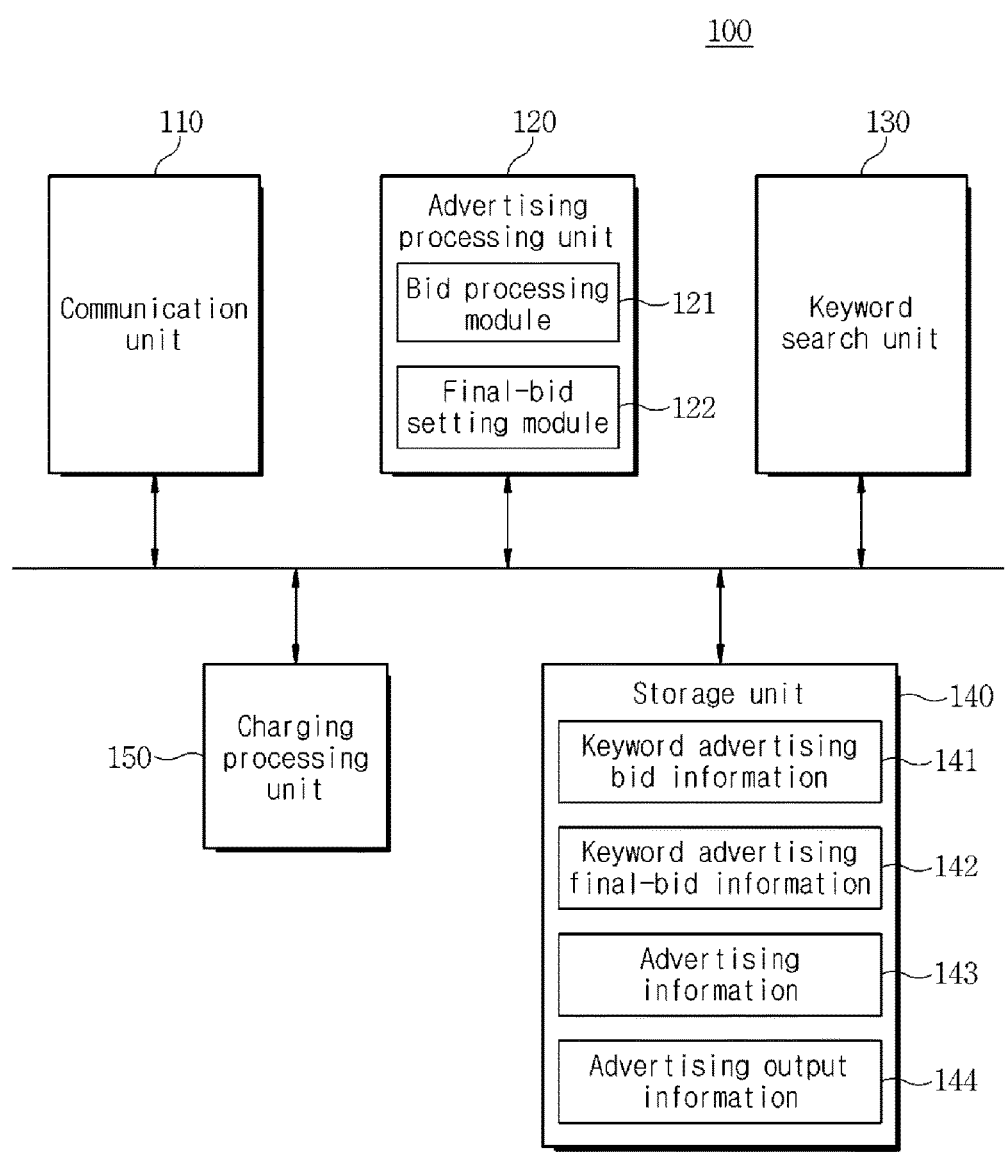

[FIG 3]
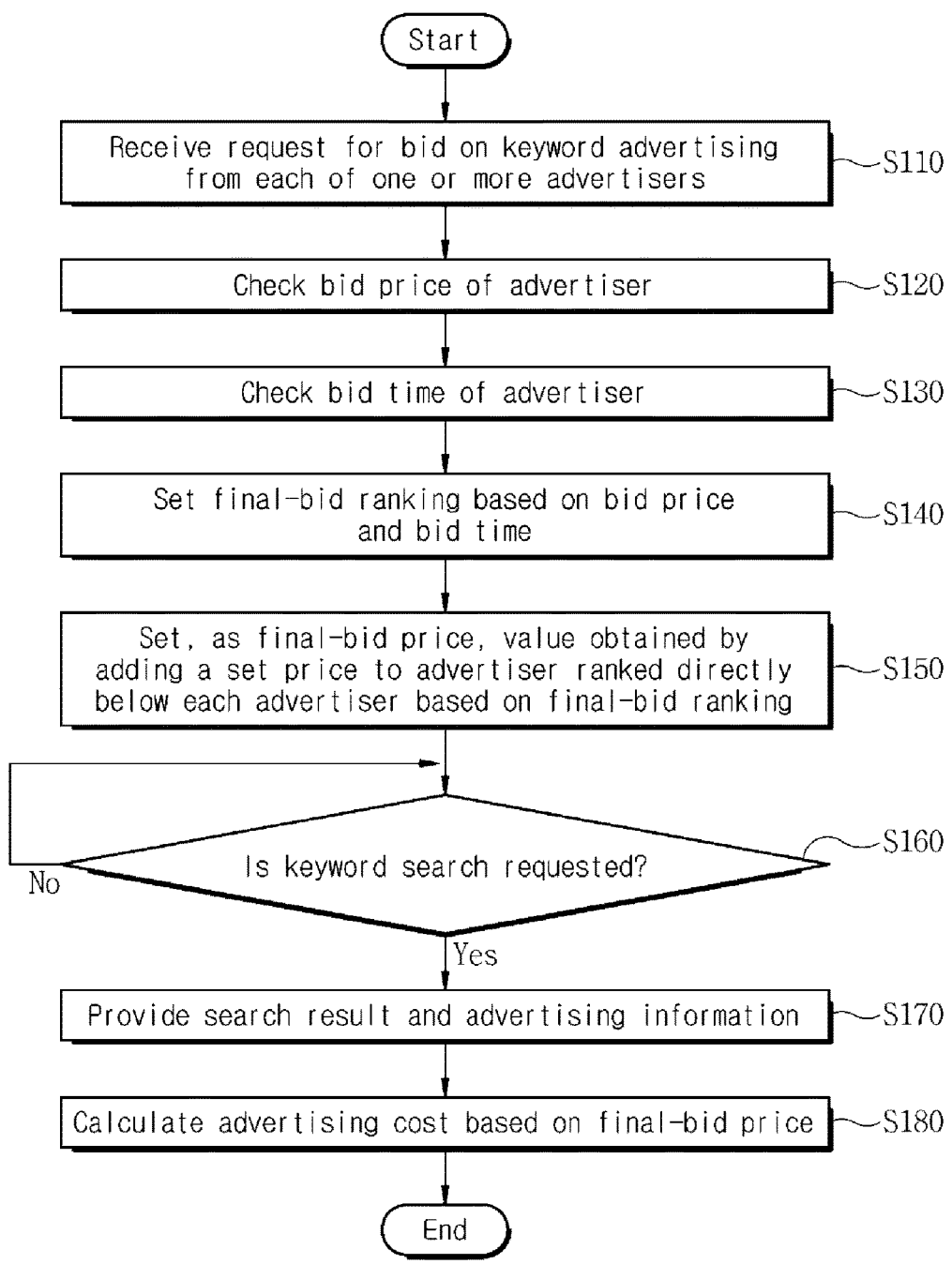

[FIG 4]

| Advertiser | Bid price | Bid time | Bid time ranking | Bid price ranking | Final-bid ranking |
|---|---|---|---|---|---|
| A | 50 | 07-19-10:41:09 | 1 | 1 | 1 |
| B | 50 | 07-19-10:41:15 | 2 | 1 | 2 |
| C | 50 | 07-19-10:41:18 | 3 | 1 | 3 |
| D | 50 | 07-19-10:41:21 | 4 | 1 | 4 |
| E | 50 | 07-19-10:41:24 | 5 | 1 | 5 |
| F | 50 | 07-19-10:41:28 | 6 | 1 | 6 |
| G | 50 | 07-19-10:41:31 | 7 | 1 | 7 |
| H | 50 | 07-19-10:41:34 | 8 | 1 | 8 |

[FIG 5]

| | A | B | C | D | E |
|---|---|---|---|---|---|
| Freckle | 100 | | | | |
| 100th day gift | 100 | 100 | 100 | 100 | |
| Double desk | 1100 | 1000 | 100 | | |
| Chest of 3 drawers | 700 | 600 | 400 | 400 | 300 |

[FIG 6]

|  | A | B | C | D | E |
|---|---|---|---|---|---|
| Freckle | 100 | | | | |
| 100th day gift | 100 | 100 | 100 | 100 | |
| Double desk | 1010 | 110 | 100 | | |
| Chest of 3 drawers | 610 | 410 | 310 | 310 | 300 |

DEVICE FOR PROVIDING KEYWORD ADVERTISING, METHOD FOR PROVIDING SUCH KEYWORD ADVERTISING, AND RECORDING MEDIUM ON WHICH IS RECORDED A PROGRAM FOR EXECUTING SAME

CROSS-REFERENCE TO RELATED APPLICATIONS

This application claims priority to and the benefit of Korean Patent Application No. 10-2011-0103520 filed in the Korean Intellectual Property Office on Oct. 11, 2011, the entire contents of which are incorporated herein by reference.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC OR AS A TEXT FILE VIA THE OFFICE ELECTRONIC FILING SYSTEM

Not applicable

STATEMENT REGARDING PRIOR DISCLOSURES BY THE INVENTOR OR A JOINT INVENTION

Not applicable

BACKGROUND OF THE INVENTION

1. Field of the Invention

The present invention relates to keyword advertising based on a network, and more particularly, to a device for providing keyword advertising, a method for providing the keyword advertising, and a recording medium for recording a program for executing the same, which can efficiently calculate advertising cost when advertising is displayed based on a keyword input by a user.

2. Description of Related Art including information disclosed under 37 CFR 1.97 and 1.98.

Keyword advertising refers to any advertising that is linked to a keyword input by a user when the user searches for a variety of information, such as news, knowledge, and products, on the Internet. In this case, the keyword-linked advertising is performed by setting a separate advertising region in a specific region of a page for providing a search result and providing advertising information of an advertiser to the advertising region.

This keyword advertising does not indiscriminately provide advertising to a number of unspecified persons, but provides the advertising only to a user who has requested a search using a keyword linked to the advertising. Accordingly, the keyword advertising has advantages in that only potential customers relatively highly likely to use a product or service provided by the advertiser may be targeted, and thus the keyword advertising has been receiving significant attention and is increasingly widely used.

In keyword advertising, the sale of keywords is achieved through an auction with bids. However, there is intense competition with respect to specific keywords having a large number of searches and thus advertising costs for the keywords are too high.

For example, a cost-per-click (CPC) method in which an advertising cost is calculated according to the number of times a user selects and clicks the advertising information (for example, a link of a web page of an advertiser, etc.) includes proposing a final-bid price for an advertising cost that should be paid for each click of the advertising information exposed from a number of advertisers through specific keyword searching, exposing the advertising information to a user depending on a position for advertising exposure, a degree of advertising exposure, etc. on the basis of the final-bid price, and calculating the advertising cost based on the proposed one-click advertising cost.

However, in this case, if the keyword has popularity, the final-bid price for the one-click advertising cost will increase, and the advertising cost may be abnormally highly calculated in comparison to the advertising effect. This may result in reduction in reliability of the advertising and shrinkage of the keyword search market. Thus a solution for using keyword advertising at a reasonable advertising cost that can satisfy both an advertiser and a service provider who provides the keyword advertising has been required.

BRIEF SUMMARY OF THE INVENTION

The present invention is directed to providing a device for providing keyword advertising, a method for providing the keyword advertising, and a recording medium for recording a program for executing the same, which can enhance service satisfaction for the advertiser by efficiently calculating the advertising cost when the keyword advertising is provided through bids, in order to solve a problem of an abnormal advertising cost in related art keyword advertising.

One aspect of the present invention provides a keyword advertising providing device including: a communication unit configured to transmit and receive data over a network; an advertising processing unit configured to receive a request for a bid on specific keyword advertising, check a bid price and a bid time of each advertiser, set a final-bid ranking according to the bid price and the bid time of the advertiser, and set, as a final-bid price, a price obtained by adding a preset price to a bid price proposed by an advertiser ranked directly below each advertiser based on the final-bid ranking of the advertiser; a keyword search unit configured to receive a keyword search request from each of one or more user terminals and transmit, to the user terminal, advertising information of one or more advertisers selected according to a search result corresponding to the keyword search request and the final-bid ranking of the keyword advertising; a charging processing unit configured to calculate an advertising cost for the advertising information based on the final-bid price set for each advertiser to provide the calculated advertising cost to the advertiser terminal; and a storage unit configured to store one or more of keyword advertising bid information including the bid price and the bid time of each of the one or more advertisers, keyword advertising final-bid information including the final-bid ranking and the final-bid price of the advertiser, advertising information of each of the one or more advertisers, and advertising output information corresponding to the advertising information.

The advertising processing unit may include: a bid processing module configured to receive the bid price of each of the one or more advertisers who have requested bids on specific keyword advertising from the advertiser terminal, check the bid time of each advertiser, the bid time being a time when the bid price is received, and register the bid price and the bid time; and a final-bid setting module configured to set the final-bid ranking of each of the one or more advertisers according to the bid price and the bid time registered by the bid processing module and set, as a final-bid price of each advertiser, a price obtained by adding the preset price to the price obtained by adding a preset price to a bid price proposed by an advertiser ranked directly below each advertiser based on the final-bid ranking of the advertiser.

When the advertiser places a rebid at the same price, the bid processing module may update the bid time to a rebid time.

The final-bid setting module may group advertisers who have proposed the same bid price into one bid group to set the same final-bid price to the advertisers grouped into one bid group.

The final-bid setting module may set the final-bid ranking to each of the advertisers grouped in one bid group in order of earlier bid time.

When only one advertiser has requested a bid on the specific keyword advertising, the final-bid setting module may set a preset lowest bid price as the final-bid price.

Another aspect of the present invention provides a keyword advertising providing method using a keyword advertising providing device for communicating between one or more advertiser terminals and one or more user terminals over a network, the keyword advertising providing method including: receiving a request, by each of one or more advertisers, for a bid on specific keyword advertising from each of the one or more advertiser terminals; receiving a bid price on the keyword advertising from the each of the one or more advertiser terminals; checking a bid time when the bid price is received, setting a final-bid ranking for each advertiser in order of higher bid price and earlier bid time; setting, as a final-bid price of each advertiser, a price obtained by adding a preset price to a bid price proposed by an advertiser ranked directly below each advertiser based on the final-bid ranking of the advertiser; transmitting advertising information of each advertiser to each user terminal according to the final-bid ranking; and calculating an advertising cost of each advertiser for the advertiser information based on the final-bid price.

The setting of the final-bid ranking may include grouping advertisers who have proposed the same bid price into one bid group to set the same final-bid price to the advertisers grouped into one bid group.

When only one advertiser has requested a bid on the specific keyword advertising, the setting of the final-bid price may include setting a preset lowest bid price as the final-bid price.

Still another aspect of the present invention provides a computer readable recording medium having a program recorded therein, the program causing a computer to execute: receiving a bid price on keyword advertising from each of one or more advertisers who have requested bids on a specific keyword; extracting a bid time when the bid price is received from the advertiser; setting a final-bid ranking for each advertiser in order of higher bid price and earlier bid time; setting, as a final-bid price of each advertiser, a price obtained by adding a preset price to a bid price proposed by an advertiser ranked directly below each advertiser based on the final-bid ranking of the advertiser; selecting advertising information of the advertiser according to the final-bid ranking to output the selected advertising information together with a search result; and calculating an advertising cost of each advertiser as the advertising information is output.

According to the present invention, in the case of providing keyword advertising, when a bid is placed on individual keyword advertising, it is possible to further check a bid time in addition to a bid price of an advertiser, set a final-bid ranking in the order of higher bid price, set the final-bid ranking in the order of earlier bid time when advertisers have proposed the same bid price, set, as a final-bid price, a price obtained by adding a preset price to a bid price proposed by an advertiser ranked directly below each advertiser based on the final-bid ranking of the advertiser, and set the same final-bid price to advertisers who have proposed the same bid price, thereby maintaining a proper level of advertising cost and thus satisfying both the advertiser and the service provider providing keyword advertising even when there is excessive competition between the advertisers.

BRIEF DESCRIPTION OF THE SEVERAL VIEWS OF THE DRAWINGS

FIG. 1 is a block diagram illustrating an entire configuration of a system for providing keyword advertising according to the present invention.

FIG. 2 is a block diagram illustrating a configuration of a keyword advertising providing device according to the present invention.

FIG. 3 is a flowchart showing a keyword advertising providing method according to the present invention.

FIG. 4 is a table illustrating an example of setting a final-bid ranking using the keyword advertising providing method according to the present invention.

FIGS. 5 and 6 are tables illustrating an example of setting a final-bid price using the keyword advertising providing method according to the present invention.

DETAILED DESCRIPTION OF THE INVENTION

Hereinafter, embodiments of the present invention will be described in detail with reference to the accompanying drawings. However, detailed descriptions related to well-known functions or configurations will be omitted in order not to unnecessarily obscure subject matters of the present invention. In addition, it should be noted that like reference numerals denotes like elements throughout the specification and drawings.

The terms or words used in the specification and claims should not be construed as being limited to typical or dictionary meanings, but construed with meanings and concepts corresponding to the technical idea of the present invention on the basis of the principle that an inventor can appropriately define the concept of the term for describing his or her invention in the best method.

FIG. 1 is a block diagram illustrating an entire configuration of a system for providing keyword advertising according to the present invention.

Referring to FIG. 1, the keyword advertising according to the present invention is provided by a keyword advertising providing device 100, a plurality of advertiser terminals 200, and a plurality of user terminals 300, which are connected over a network 10.

Here, the network 10 is a wired/wireless network accessible by a plurality of advertiser terminals 200 and a plurality of user terminals 300, which for example includes a next generation communication network to be developed in the future in addition to a variety of communication networks such as an internet protocol (IP) network for providing large-scale data transmission and reception service and seamless data service through an Internet protocol, an IP network integrated with another network (All IP), a wireless broadband (Wibro) network, a wireless local area network (LAN) including a Wi-Fi network, a wired communication network, a mobile communication network, a High Speed Downlink Packet Access (HSDPA) network, and a satellite communication network.

The keyword advertising providing device 100 is a device configured to, when a user requests a specific keyword search, provide advertising of one or more advertisers who request advertising through the keyword to the user who has requested the specific keyword search. The keyword advertising providing device 100 may be linked with a variety service, such as a portal site that provides a search service, an electric commerce site that sells one or more products or services or provides a transaction space, etc., and configured to provide advertising associated with the keyword based on the input keyword when a user searches for products or information through the linked service.

In particular, in order to charge an advertising cost to an advertiser who has requested the keyword advertising, the keyword advertising providing device 100 according to the present invention is configured to receive a bid price from an advertiser, check a bid time of the advertiser, set a final-bid ranking of the advertiser based on the bid price and the bid time, and set, as a final-bid price, a price obtained by adding a preset price to a bid price proposed by an advertiser ranked directly below the advertiser based on the final-bid ranking. In this case, advertisers who have proposed the same bid price may be grouped into one bid group and set to have the same final-bid price. Then advertising information of each advertiser is provided to a user who has input the keyword on the basis of the final-bid ranking and the final-bid price. Subsequently, the advertising costs are calculated based on the final-bid prices according to responses of users, and the calculated advertising costs are charged to the advertisers.

According to this, even if the final-bid price is increased due to excessive competition between the advertisers, a proper level of advertising cost may be set, thereby satisfying both the advertisers and the service provider who provides the keyword advertising.

FIG. 2 is a block diagram illustrating a configuration of a keyword advertising providing device according to the present invention.

Referring to FIG. 2, the keyword advertising providing device according to the present invention may be configured to include a communication unit 110, an advertising processing unit 120, a keyword searching unit 130, a storage unit 140, and a charging processing unit 150.

The communication unit 110 transmits and receives data to and from a plurality of advertiser terminals 200 and a plurality of user terminals 300 over the network 10. In this case, the transmitted and received data may include a keyword advertising bidding request, a bid result, a user's search keyword, a keyword searching result and advertising information, and advertising cost charging information calculated according to advertising provision. The information transmitted to the plurality of advertiser terminals 200 and the plurality of user terminals 300 through the communication unit 110 may be provided using the World Wide Web.

The advertising processing unit 120 is configured to receive a bid for keyword advertising and provide the keyword advertising, and specifically, to receive and check a bid price for specific keyword advertising from each of one or more advertiser terminals of advertisers who have requested the keyword advertising and further check a bid time of the advertiser. Here the bid time may be set based on a time at which the bid price of the advertiser is received or input from the advertiser terminal 200.

Additionally, the advertising processing unit 120 sets a final-bid ranking of each of the one or more advertisers according to the checked bid prices and bid times and sets, as a final-bid price for the advertising cost of each of the one or more advertisers, a price obtained by adding a preset price to a bid price proposed by an advertiser ranked directly below each advertiser on the basis of the final-bid ranking of the advertiser.

When a keyword search is requested by a plurality of user terminals 300, the keyword search unit 130 extracts advertising information of the advertisers on the basis of the final-bid rankings of the plurality of advertisers, which are set for the requested keyword, and transmits the extracted advertising information together with a result of the keyword search to the user terminals 300.

In addition, in order to process the above-described functionality, the advertising processing unit 120 may include a bid processing module 121 and a final-bid setting module 122. The bid processing module 121 and the final-bid setting module 122 may be implemented in software or a combination of software and hardware and configured to perform processing during the bid.

Specifically, the bid processing module 121 receives a bid price of each of one or more advertisers who have requested bids for the specific keyword advertising and then checks and registers the bid time of the advertiser. In this case, the same advertiser may try to place a rebid on the same keyword advertising. If the bid price is changed, the bid information of the advertiser is updated to include the changed bid price and the bid time when the bid price is changed. Furthermore, if the advertiser places a rebid on the same keyword advertising at the same price, the present invention updates the bid time of the advertiser to the rebid time. That is, the bid time is determined based on the last bid when the same bid is iteratively placed, thereby preventing the advertiser from placing excessive bids.

The final-bid setting module 122 sets a final-bid ranking of each of the one or more advertisers according to the bid price and the bid time registered by the bid processing module 121 and sets, as a final-bid price of each of the one or more advertisers, a price obtained by adding a preset price to a bid price proposed by an advertiser ranked directly below each advertiser on the basis of the final-bid ranking of the advertiser. In this case, the final-bid ranking is determined based on the bid price preferentially, and determined based on the bid time if the advertisers have proposed the same bid price.

In addition, when the final-bid rankings and the final-bid prices are set for the plurality of advertisers who have placed bids on the same keyword, the final-bid setting module 122 is configured to group advertisers who have proposed the same bid price into one bid group and set the same final-bid price to the advertisers grouped into the one bid group.

However, only one advertiser may place a bid on some keywords. When one advertiser has placed a bid on specific keyword advertising, a preset lowest bid price is set as the final-bid price. That is, irrespective of the bid price of the advertiser, the lowest bid price is set as the final-bid price, thereby providing a reasonable advertising cost to the advertiser.

In addition, while the advertising information of the advertiser, which is associated with the keyword input to the user terminal 300 that has requested the keyword advertising through the keyword search unit 130, is transmitted, the charging processing unit 150 performs a charging process by calculating advertising costs for one or more advertisers on the basis of the final-bid price set for each advertiser through the final-bid setting module 122 of the advertising processing unit 120. For example, when the charging is performed in a cost-per-click (CPC) method, and each of the bid price and the final-bid price is an advertising cost for each click, the charging processing unit 150 checks the number of clicks of users on the advertising information of each advertiser, calculates a total advertising cost by multiplying the checked number of clicks by the final-bid price set for the advertiser, and transmits the calculated advertising cost to the advertiser terminal 200 of the advertiser.

In addition, the charging processing unit 150 may perform payment processing on the calculated advertising cost in cooperation with the commercial terminal 200.

Finally, the storage unit 140 is a storage device for storing data needed for operations, such as service provision, of the keyword advertising providing device 100 and specifically includes at least one of keyword advertising bid information 141 including bid prices and bid times of one or more advertisers for individual keyword advertising processed by the advertising processing unit 120, keyword advertising final-bid information 142 including final-bid rankings and final-bid prices of the one or more advertisers who have placed a bid on keyword advertising set by the advertising processing unit 120, advertising information 143 intended to be advertised by the one or more advertisers to a user, and advertising output information 144 transmitted to the user terminal 300 through the keyword search unit 130 and output to the user.

Subsequently, a keyword advertising providing method according to the present invention, which is performed by the keyword advertising providing device 100 configured as described above will be described in sequence with reference to FIG. 3.

FIG. 3 is a flowchart showing a keyword advertising providing method according to the present invention.

Referring to FIG. 3, in operation S110, the advertising processing unit 120 of the keyword advertising providing device 100 receives a request for a bid on specific keyword advertising from one or more terminals 200 through the communication unit 110. This may be achieved by the keyword advertising providing device 100 providing a web page for the keyword advertising and receiving selection of the request for the bid of the keyword advertising from the advertiser terminal 200 through the page.

Next, in operation S120, the advertising processing unit 120 receives bid prices for the keyword advertising from the one or more advertiser terminals 200 of the advertisers. This may be achieved by receiving a bid price from an advertiser terminal 200 which has requested a bid on specific keyword advertising or simultaneously receiving a bid price and a request for a bid on specific keyword advertising.

In operation S130, the advertising processing unit 120 further checks bid times of the advertisers. Each bid time is set as a time when the advertising processing unit 120 receives the bid time from the advertiser terminal 200.

In operation S140, the advertising processing unit 120 sets final-bid rankings of the advertisers on the basis of the bid prices and the bid times of the advertisers, which are checked as described above in operation S140. Specifically, the advertising processing unit 120 sets the final-bid rankings of the advertisers in descending order of bid price and if there are two or more advertisers who have proposed the same bid price, compare bid times between the advertisers to give a higher final-bid ranking to an advertiser having an earlier bid time.

FIG. 4 illustrates an example of setting a final-bid ranking using the keyword advertising providing method according to the present invention. Referring to FIG. 4, the advertisers A to H have proposed the same bid price of 50 won, the bid time of advertiser A is earliest, and the remaining bid times are, in order, B, C, D, E, F, G, and H. In this case, all the final-bid rankings may be set to be the same. However, according to the present invention, since the final-bid rankings are given according to the bid time when the bid price is the same, the final-bid ranking of advertiser A is highest and the final-bid ranking is higher in the order of B, C, D, E, F, G, and H. In operation S150, the advertising processing unit 120 sets, as a final-bid price for the advertising cost of each of the one or more advertisers, a price obtained by adding a preset price to a bid price proposed by an advertiser ranked directly below each advertiser on the basis of the final-bid ranking of the advertiser, which is set as described above. For example, a bid price for an advertiser having the lowest ranking is set as the final-bid price thereof, and the prices obtained by adding a preset price to a bid price of an advertiser ranked directly below each of the other advertisers are set as the final-bid prices thereof. In this case, the advertising processing unit 120 may further group advertisers who have proposed the same bid price into one bid group and set the same final-bid price to the advertisers grouped into one bid group when the final-bid price is set. That is, advertisers who have proposed the same bid price may be given the same final-bid price. In addition, when only one advertiser has requested a bid on specific keyword advertising, that is, when only one bid is placed, the advertising processing unit 120 may set a preset lowest bid price of the advertiser as the final-bid price thereof. That is, when only one bid is placed on specific keyword advertising, a preset lowest bid price is set as the final-bid price, thereby reasonably calculating an advertising cost and thus enhancing reliability of advertisers.

FIGS. 5 and 6 illustrate an example of setting a final-bid price using the keyword advertising providing method according to the present invention. FIG. 5 illustrates bid prices of first to fifth final-bid rankings with respect to keywords 'freckle,' '$100^{th}$ day gift,' 'double desk,' and 'chest of 3 drawers.' FIG. 6 illustrates final-bid prices when the bids are placed as described in FIG. 5. In this case, the lowest bid price is assumed to be 100 won.

Referring to FIG. 5, for the keyword 'freckle,' since only one bid is placed, the bid price is 100 won, and as shown in FIG. 6, the lowest bid price of 100 won is set as the final-bid price.

In addition, for a keyword '$100^{th}$ day gift,' since bids are placed by a plurality of advertisers and all the bid prices are the same, all the advertisers are given the same final-bid price of 100 won. In this case, since the bid prices are the same, but the final-bid rankings vary depending on the bid times, advertising information of an advertiser having a higher final-bid ranking is preferentially provided.

Furthermore, since two or more advertisers have placed bids on keywords 'double desk' and 'chest of 3 drawers,' a bid price proposed by an advertiser having a lowest final-bid ranking is set as a final-bid price of the advertiser, and prices obtained by adding a preset price (for example, 10 won) to a bid price proposed by an advertiser ranked directly below each of the other advertisers are set as final-bid prices thereof.

That is, an advertiser having a first final-bid ranking with respect to a keyword 'double desk' has proposed a bid price of 1100 won. However, irrespective of this, the final-bid price is set as 1010 won, which is obtained by adding 10 won to 1000 won that has been proposed by an advertiser having a second final-bid ranking.

Returning to FIG. 3, when a keyword search request is received from a user terminal 300 in operation S160, the keyword search unit 130 performs a search using the received keyword and transmits a search result to the user terminal 300 in operation S170. In this case, in operation S170, one or more pieces of information are selected from among pieces of advertising information of one or more advertisers on the basis of the final-bid rankings set by the advertising processing unit 120 and transmitted to the user terminal 300, together with the search result. In this case, the advertising information may be inserted into a predetermined region of a web page where the search result is displayed.

When the advertising information is provided to the user terminal 300, an advertising cost for the advertising information is calculated for each advertiser in operation S180. The calculated advertising cost is provided to the advertiser terminal 200, such that a request may be made for payment of the advertising cost.

In addition, the charging processing unit 150 may perform electronic payment processing on the calculated advertising cost in cooperation with the advertiser terminal 200.

The keyword advertising providing method according an embodiment of the present invention may be implemented as program instructions executable by a variety of computers and recorded on a computer readable medium. Here, the recording medium may include a program instruction, a data file, a data structure, or a combination thereof. The program instructions recorded on the computer readable medium may be designed and configured specifically for the present invention or can be publicly known and available to those who are skilled in the field of software. Examples of the recording medium include a magnetic medium such as a hard disk, a floppy disk, and a magnetic tape, an optical medium such as a compact disk read only memory (CD-ROM) and a digital video disk (DVD), a magneto-optical medium such as a floptical disk, and a hardware device specially configured to store and perform the program instruction, such as a read only memory (ROM), a random access memory (RAM), a flash memory, etc. Examples of the program instruction include a high-level language code executable by a computer with an interpreter, in addition to a machine language code made by a compiler. The above exemplary hardware device can be configured to operate as one or more software modules in order to perform the operation of the present invention, and vice versa.

Although specific embodiments have been illustrated and described herein, it is obvious to those skilled in the art that many modifications of the present invention may be made without departing from what is intended to be limited solely by the appended claims. While preferred embodiments of the present invention have been described using specific terms, such description is for illustrative purposes only, and it is to be understood that changes and variations may be made without departing from the spirit or scope of the following claims.

According to the present invention, in the case of providing keyword advertising, when a bid is placed on individual keyword advertising, it is possible to further check a bid time in addition to a bid price of an advertiser, set a final-bid ranking in the order of higher bid price, set the final-bid ranking in the order of earlier bid time when advertisers have proposed the same bid price, set, as a final-bid price, a price obtained by adding a preset price to a bid price proposed by an advertiser ranked directly below each advertiser based on the final-bid ranking of the advertiser, and set the same final-bid price to advertisers who have proposed the same bid price, thereby maintaining a proper level of advertising cost and thus satisfying both the advertiser and the service provider providing keyword advertising even when there is excessive competition between the advertisers.

The invention claimed is:

1. A keyword advertising providing method performed by a keyword advertising providing device for communicating between one or more advertiser terminals and one or more user terminals over a network, the keyword advertising providing device including one or more integrated logic circuits to execute the keyword advertising providing method comprising:
   receiving a request, by each of one or more advertisers, for a bid on specific keyword advertising from each of the one or more advertiser terminals;
   receiving a bid price on the keyword advertising from the each of the one or more advertiser terminals;
   checking a bid time when the bid price is received;
   setting a final-bid ranking for each advertiser in order of higher bid price and earlier bid time;
   setting, as a final-bid price for the specific keyword used for advertising, a price obtained by adding a preset price to a bid price proposed by an advertiser ranked directly below each advertiser, when there is an advertiser ranked directly below another advertiser, based on the final-bid ranking of each advertiser;
   transmitting a signal for advertising information of each advertiser to each user terminal according to the final-bid ranking;
   detecting a number of clicks by user inputs on the advertisement information of each advertiser;
   calculating an advertising cost to each advertiser for their respective advertising information based on the final-bid price and the detected number of clicks by user inputs on the advertising information of each advertiser; and
   outputting the respective advertising cost to each advertiser;
   wherein when only one advertiser has requested a bid on the specific keyword advertising, a preset lowest bid price is set as the final-bid price,
   wherein when the advertiser places a rebid at the same price, the keyword advertising providing device updates the bid time to a rebid time, and
   wherein the setting of the final-bid ranking comprises grouping advertisers who have proposed the same bid price into one bid group to set the same final-bid price to the advertisers grouped into one bid group.

2. A non-transitory computer readable recording medium having a program recorded therein, the program causing one or more integrated logic circuits included in a computer to execute:
   receiving a request, by each of one or more advertisers, for a bid on specific keyword advertising from each of one or more advertiser terminals;

receiving a bid price on the keyword advertising from the each of the one or more advertiser terminals;

checking a bid time when the bid price is received;

setting a final-bid ranking for each advertiser in order of higher bid price and earlier bid time;

setting, as a final-bid price for the specific keyword used for advertising, a price obtained by adding a preset price to a bid price proposed by an advertiser ranked directly below each advertiser, when there is an advertiser ranked directly below another advertiser, based on the final-bid ranking of each advertiser;

transmitting a signal for advertising information of each advertiser to each user terminal according to the final-bid ranking;

detecting a number of clicks by user inputs on the advertisement information of each advertiser;

calculating an advertising cost to each advertiser for their respective advertising information based on the final-bid price and the detected number of clicks by user inputs on the advertising information of each advertiser; and outputting the respective advertising cost to each advertiser;

wherein when only one advertiser has requested a bid on the specific keyword advertising, set a preset lowest bid price as the final-bid price, wherein when the advertiser places a rebid at the same price, the keyword advertising providing device updates the bid time to a rebid time, and wherein the setting of the final-bid ranking comprises grouping advertisers who have proposed the same bid price into one bid group to set the same final-bid price to the advertisers grouped into one bid group.

* * * * *